United States Patent Office 2,897,906
Patented Aug. 4, 1959

2,897,906

AUTOMATIC SPEED CONTROL DEVICE FOR AUTOMOTIVE VEHICLES

Antoine Brueder, Paris, France, assignor to Societe Anonyme Andre Citroen, Paris, France, a corporation of France Application November 7, 1955, Serial No. 545,469

Claims priority, application France November 6, 1954

6 Claims. (Cl. 180—82.1)

This invention relates to automatic speed controls.

It is well known that, in order to maintain the speed of a vehicle at a constant value, it is necessary to act on the accelerator whenever the power demanded varies.

The present invention has for an object the provision of a device which is intended to maintain the speed of a vehicle substantially constant as long as the position of the accelerator remains unchanged.

To this end, the device comprises a rod or other member which moves under the action of the accelerator, in proportion to and in accordance with the movement of the latter, the extremity of the said rod cooperating with two arms of a forked member between which it terminates, each of these arms being in turn coupled to a member adapted to control the power of the engine. Each arm works in a different sense, and the forked member is driven in dependence on the speed of the vehicle, so that when the rod comes in contact with one of the arms of the fork, this arm acts on the member controlling the engine and in a direction such that the speed of the vehicle is modified to cause the contact between the rod and the arm of the fork to cease.

A further object of the invention is to provide for the application of a device of the above kind to the control of a vehicle in order that the driver may keep the accelerator in a constant position while obtaining a pre-determined speed, whatever changes may take place in the resistive forces opposing the propulsive action of the engine.

The invention will next be described with reference to the attached drawings in which.

Figure 1:
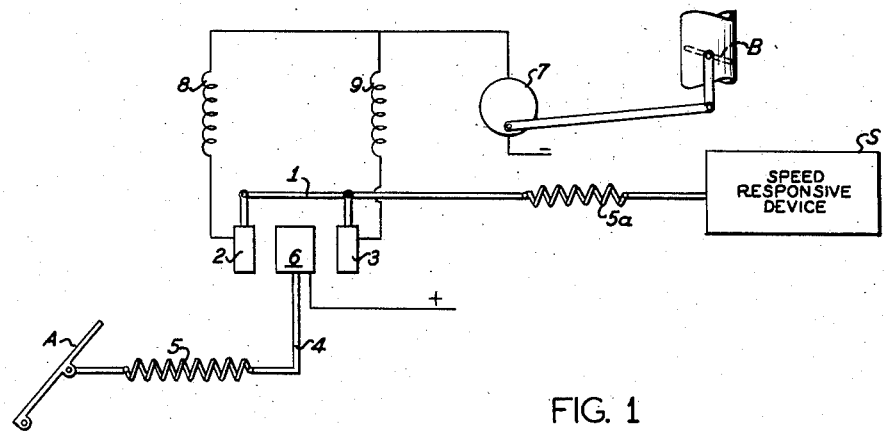
Fig. 1 is a diagrammatic view of an electrical device provided in accordance with one embodiment of the invention.

With reference to the drawings, the device shown in Fig. 1 is constituted essentially by a forked member 1, the arms of which are provided with contacts 2 and 3 which are displaced as a function of the speed of the vehicle. A rod 4 is elastically coupled, for example, through the medium of a spring 5 to the accelerator control A.

The extremity of the rod 4 is provided with a conductive contact 6 connected to a terminal of a suitable source of electric current and is intended to co-operate with the contacts 2 and 3 to produce rotation, in one direction or the other depending on the contacts which are made, of a motor which acts on a conventional butterfly valve B in the associated petrol intake (not shown). In the example shown, the motor 7 is provided with two oppositely-wound field windings 8 and 9, one of which is connected in series with the contact stud 2 and the other in series with the contact stud 3. Each contact stud is connected to a winding having a direction such that it tends to cause the motor 7, and in consequence the butterfly valve to rotate in the direction which tends to break the contact between the contact stud 6 and the contact 2 or 3, as the case may be.

Thus, when the speed of the vehicle falls or increases, without the driver having modified the position of the accelerator, the fork 1 moves and one of the arms comes into contact with the contact stud 6 and carries it along while compressing or expanding the elastic device or spring 5; this gives rise to the passage of current in one of the field windings and the motor 7 rotates in the corresponding direction, producing an acceleration or a deceleration of the engine by its action on the butterfly valve. When the speed of the engine has been sufficiently varied the speed of the vehicle is brought back to the value for which the fork member lies on each side of the rod 4 without making contact, the motor 7 stops and the vehicle continues its course at the constant speed chosen, determined by the position of the accelerator, under the effect of the new position of the butterfly valve.

The operation is exactly the same if it is the rod 4 which is moved under the action of a change in position of the accelerator, when the driver wishes to increase his speed, the rod 4 then comes into contact with one of the two contacts 2 or 3.

The spring 5 is provided in order to enable the fork member 1 to be positively operated from a speed-indicator member or speed responsive device S and to enable displacement of the rod 4 without any displacement of the accelerator or to enable movement of the accelerator without the position of the rod being substantially modified. It is obvious that this spring could be arranged on the arm of the lever 1 connected to the speed-indicator device (see spring 5a), the rod 4 being rigidly coupled to the accelerator.

Figure 2:
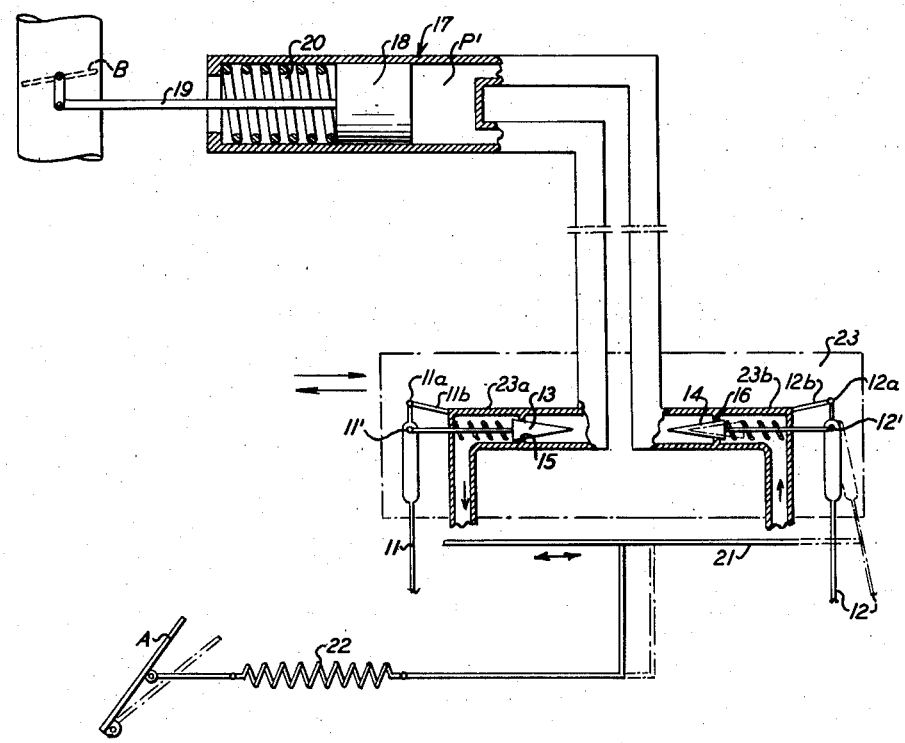
Fig. 2 is a diagrammatic view of a hydraulic device provided in accordance with the invention.

Fig. 2 shows a device similar to that of Fig. 1, but with a hydraulic action.

In this case, the two arms 2 and 3 of the forked member are replaced by levers 11 and 12 which are connected to conical needles 13 and 14 by pivot pins 11' and 12' and which levers control conical needles 13 and 14. Operation of these needles controls the openings 15 and 16 of a hydraulic circuit comprising a cylinder 17 in which is adapted to move a piston 18 rigidly coupled through a rod 19 to the butterfly valve. A spring 20 arranged in the base of the cylinder acts in opposition to the pressure of a fluid admitted into the cylinder through the opening 16. The part 23 of the hydraulic circuit and the levers 11 and 12 move laterally in dependence on the speed of the vehicle. It will be noted that levers 11 and 12 are respectively pivoted by pins 11a and 12a to arms 11b and 12b. Arms 11b and 12b are rigidly fixed on conduits 23a and 23b which move with component 23.

At a given moment, the pressure of the fluid enclosed in the cylinder 17 has a value P' which is balanced by the action of the spring 20. If the speed of the vehicle is reduced (or if the accelerator is pressed farther down), the rod 21, which is elastically coupled to the accelerator rod, for example through the medium of a spring 22, moves and pushes the lever 12 and thus effects the opening of the port 16, this having the result of increasing the pressure P' and opening the butterfly valve. As soon as the speed has reached a value close to its initial value, the action of the rod 21 and lever 12 is removed and the butterfly valve will maintain its new position. The form of the needle valves enables an action to be obtained which increases in effect with increasing differences between the rear speed and the desired speed.

In the case of an increase in speed (or a release of the accelerator), it is the lever 11 which acts, causing a drop in pressure inside the cylinder 17 and giving rise to a reduction in the opening of the butterfly valve.

What is claimed is:

1. An automatic control device for the engine of an automobile vehicle enabling a constant running speed to be obtained for a given position of an accelerator control provided in said vehicle, the vehicle having a speed indicator device, the said control device comprising: a first movable member coupled to the said accelerator control and adapted to move in correspondance therewith; a second movable member associated with said speed indicator device; a forked portion connected rigidly with one of said members, the fork including arms located one on each side of the other member; means whereby movement of either of said members causes contacting engagement thereof with the other of said members and a direct thrust therebetween; a motor driven in accordance with said thrust for controlling the engine of said vehicle so as to vary the speed to restore the said members to a position in which they are spaced from each other, and an elastic device coupling said first movable member to said accelerator control.

2. An automatic control device for the engine of an automobile vehicle enabling a constant running speed to be obtained for a given position of an accelerator control provided in said vehicle, the vehicle having a speed indicator device, the said control device comprising: a first movable member coupled to the said accelerator control and adapted to move in correspondance therewith; a second movable member associated with said speed indicator device; a forked portion connected rigidly with one of said members, the fork including arms located one on each side of the other member; means whereby movement of either of said members causes contacting engagement thereof with the other of said members and a direct thrust therebetween; a motor driven in accordance with said thrust for controlling the engine of said vehicle so as to vary the speed to restore the said members to a position in which they are spaced from each other, and an elastic device coupling said second movable member to said speed indicator device.

3. An automatic speed control device for the engine of an automobile vehicle enabling a constant running speed to be obtained for a given position of an accelerator control provided in said vehicle, the vehicle having a speed indicator device, the said control device comprising: a first movable member having one extremity coupled to said accelerator control and another extremity constituting an electrical contact; a second movable member having one extremity coupled to the speed indicator device of said vehicle and having another extremity constituting a forked portion, the forked portion including two arms each including an electrical contact disposed one on each side of the contact of said first member and adapted to co-operate therewith; a source of electric current connected to the contact of said first member; an electric motor adapted to control the engine of said vehicle, two oppositely-acting field windings on said motor, each said field winding being connected to one of the contacts of said forked portion; contact between said contact of said first member and one of the contacts of said second member causing the said engine to be controlled to restore the spaced relation between said three contacts.

4. An automatic device as claimed in claim 3, comprising a spring coupling said first member and said accelerator control.

5. An automatic device as claimed in claim 3, comprising a spring in the coupling between said second member and said speed indicator device.

6. An automatic control device for the engine of an automobile vehicle enabling a constant running speed to be obtained for a given position of an accelerator control provided in said vehicle, the vehicle having a speed indicator device, the said control device comprising: a first movable member having one extremity coupled to the accelerator control of said vehicle and its other extremity constituting a two-armed rod; a cylinder supplied with fluid under pressure; a piston adapted to move in said cylinder and loaded by a compression spring acting in opposition to said fluid pressure applied to said piston, said piston constituting a second movable member coupled to the engine of said vehicle; piping means including a needle valve for admitting fluid under pressure into said cylinder; piping means including a needle-valve for exhausting said fluid from said cylinder; two oppositely-acting lever means for actuating respectively each of said needle-valves, said lever means being located one on each side of said two-armed rod; so that actuation of said two-armed rod in one direction opens one said needle-valve and closes the other and vice-versa, whereby the pressure in said cylinder and the position of said piston are varied in dependence on the position of said first member, and an elastic device coupling said first member and said accelerator control.

References Cited in the file of this patent

UNITED STATES PATENTS

| | | |
|---|---|---|
| 1,829,887 | Brown | Nov. 3, 1931 |
| 2,160,194 | Bates | May 30, 1939 |
| 2,243,354 | Musser | May 27, 1941 |
| 2,302,322 | Howard | Nov. 17, 1942 |
| 2,714,880 | Riley | Aug. 9, 1955 |